(12) United States Patent
Thornton

(10) Patent No.: US 10,762,812 B1
(45) Date of Patent: Sep. 1, 2020

(54) COMPACT AND STAND ALONE HOLOGRAPHIC DEVICE USING MOBILE PHONE, TABLET, OR COMPUTER SCREEN

(71) Applicant: ProVision Interactive Technologies, Inc., Chatsworth, CA (US)

(72) Inventor: Curt Thornton, Simi Valley, CA (US)

(73) Assignee: Provision Interactive Technologies Inc., Chatsworth, CA (US)

( * ) Notice: Subject to any disclaimer, the term of this patent is extended or adjusted under 35 U.S.C. 154(b) by 0 days.

(21) Appl. No.: 16/104,265

(22) Filed: Aug. 17, 2018

(51) Int. Cl.
| | | |
|---|---|---|
| G09G 3/00 | (2006.01) | |
| G06T 15/08 | (2011.01) | |
| G06F 3/0481 | (2013.01) | |
| H04M 1/725 | (2006.01) | |
| G02B 30/56 | (2020.01) | |
| G06F 3/0488 | (2013.01) | |

(52) U.S. Cl.
CPC .............. *G09G 3/003* (2013.01); *G02B 30/56* (2020.01); *G06F 3/04815* (2013.01); *G06T 15/08* (2013.01); *H04M 1/72527* (2013.01); *G06F 3/0488* (2013.01)

(58) Field of Classification Search
None
See application file for complete search history.

(56) References Cited

U.S. PATENT DOCUMENTS

| | | | |
|---|---|---|---|
| 2009/0109404 A1* | 4/2009 | Thornton | G02B 27/2292 353/10 |
| 2014/0247343 A1* | 9/2014 | Chen | G02B 27/017 348/135 |
| 2015/0080065 A1* | 3/2015 | Zhang | H01L 23/66 455/575.7 |
| 2018/0204416 A1* | 7/2018 | Perea-Ochoa | A63F 1/00 |

* cited by examiner

*Primary Examiner* — Yanna Wu
(74) *Attorney, Agent, or Firm* — Pryor Cashman LLP

(57) ABSTRACT

A system and method for projecting a holographic image of an object, the system preferably comprising a mobile or smart phone having a power supply source; a central processing unit; software provided by the smart phone for transforming a two dimensional image to project an untethered or seemingly suspended holographic image, the smart phone preferably providing the light source and a holographic, table top projection device having a display window configured to permit the holographic image to be projected therethrough and into space adjacent to the table top device, wherein the optical elements for enabling the holographic projection, namely, a spherical mirror, a circular polarizer, and a beam splitter are housed in the table top device and the same is provided with a slot or pocket configured to hold and maintain the smart phone in mechanical and electronic connection to the table top device.

20 Claims, 1 Drawing Sheet

COMPACT AND STAND ALONE HOLOGRAPHIC DEVICE USING MOBILE PHONE, TABLET, OR COMPUTER SCREEN

CROSS-REFERENCE TO RELATED APPLICATIONS

The present application claims priority to U.S. Provisional Patent Application No. 62/548,710, filed Aug. 22, 2017, the disclosures and teachings of which are incorporated herein by reference.

TECHNICAL FIELD

The present invention relates to a holographic or three-dimensional image projection device. More particularly, the present invention relates to a holographic or three-dimensional image projection device of a compact and standalone nature and configured for use with a mobile phone, a tablet, lap top, a computer screen, and the like. In the preferred embodiment, the images to be displayed by the device in a three dimensional and seemingly untethered or realistic manner are provided by a smart phone and/or an internet website. The app of the phone or the website will provide either a two or three dimensional set of video frames which will be projected into three dimensions near to the screen of the phone/computer to present a quite realistic three dimensional image in air, preferably a set of moving images.

BACKGROUND OF THE INVENTION

The present invention relates to holographic images, i.e., three-dimensional visual images which are projected from a device and not onto a display screen, but rather into the air in front of or above the device. This provides a very realistic and novel visual effect. It is now known how to create and project these three-dimensional visual images to consumers shopping in stores and malls. Projectors producing the three-dimensional image, or hologram, can be useful for consumer interest (dispensing coupons, advice, information, etc.) and can be highly entertaining, too. Today, these holographic images are projected outwardly and away from a device with suitable lighting, power (usually AC power outlet connectivity), software, and optics. These devices are expensive and cumbersome but do provide a visually effective and entertaining set of visual images. However, it is the present inventive concept to incorporate a smaller footprint device for sitting upon a table or desktop and to use the power (battery and/or AC outlet) along with the software of a mobile phone, tablet, or computer with or without its own display screen to provide a seemingly untethered visual effect and set of images, seemingly suspended above and away from the actual monitor or display screen of the physical device. The optics for the untethered projection may be housed in the table top device, but the software for generating the holographic image and the power for projecting the same from images may originate with the mobile phone, tablet, the internet or a computer screen. According to the concept of the present invention, a receiving slot or pocket in the table top device is provided for allowing the user to selectively slide the mobile phone, tablet, or computer screen from a lap top or tablet into the device. The mobile phone, tablet, or laptap will generate the initial set of images and also convert the same into a set of untethered or holographic images, with suitable controls either on the device or with touch sensitive controls connected to the operation of the mobile phone, tablet, or computer screen. In this connection, by "untethered" Applicant means that the holographic image appears suspended and apart from the physical screen of the device. In this manner, the untethered three dimensional image or set of moving images, appears suspended, in front or above the physical device in a highly entertaining and mesmerizing manner. The image(s) will project through the optics of the device, as will be described, and the power and software preferably provided by the mobile phone, tablet, or a computer screen or a desk top or laptop computer. Once the display has been viewed and the observation completed, the mobile phone, tablet, or computer screen can be easily removed from the physical table top device for use in the manner of a typical mobile or smart phone, tablet, or computer with a monitor screen. Basically, the present invention contemplates a mobile or smart phone, with suitable software and resident application(s) and/or connection to the Internet with software for selecting a two dimensional ordinary image for a screen and converting the same into a three dimensional image untethered i.e., suspended above the actual screen to present a highly entertaining and visually commanding effect.

The prior art shows three-dimensional or holographic and untethered images which project above or in front of specialty-designed display devices. Within the devices, generally sitting on a stand-alone kiosk, are sophisticated optics, mirrors, lenses, a source of power and light to drive and project the images, and software for creation and projecting the holographic images based on original two dimensional images. Currently, ProVision Holding Inc. of Chatsworth, Calif. provides such a kiosk device. A representative two-dimensional view, a ProVision Overview, and related technology to the holographic and untethered display platform and its features can be viewed online at www.provision.tv. Many of these devices are in retail stores, now, seeking to command the attention of consumers. They are successful at capturing the attention of consumers as the three dimensional images projected above and forwardly from the hard screen of the displays are quite unusual and visually entertaining. Many of these displays show rotating or moving three dimensional objects. The devices project a three-dimensional image into the air adjacent (in front and/or above) the device of a kiosk, and the image can be provided with motion, i.e., spinning slowly on a vertical axis, horizontal axis, or multiple axes. The holographic display now in use in certain retail pharmacies may act as a point-of-sale display and project high-resolution video advertisements that seemingly float in space approximately 12 inches in front and/or above the hard screen. This creates wonderful and effective marketing opportunities for the retailer and for the products being three-dimensionally displayed through an exciting and memorable experience for the consumers and a usually hard fought for commercial impression for advertisers.

To date, however, these devices have been very bulky and expensive, with sophisticated power, lighting, and software. That prevents them from being made for home use and entertainment—the expense would likely be prohibitive for the mass market. However, there is a need for such use, and it is believed that having a compact, home usable, three-dimensional or holographic and untethered visual image provider would be highly entertaining and hugely successful for the manufacturer and/or marketer of the same. Games could be played and displayed in three dimensions, objects could be displayed, e.g., sculpture, art, etc., and, even possibly, phone calls between participants could be made such that the caller and the receiver could have both of their heads visually appearing in holographic style in the room or at the location of the other. The possibilities of use and entertainment seem enormous and huge revenues could be generated if one were able to make, market, and sell such devices at a reasonable cost.

However, as mentioned, there is a need for a source of power, a need for a central processing unit (CPU) with software to create and drive the holographic projected image from a two dimensional image, and a need for light for the projection of a holographic image. Kiosks provide those components but are believed too large and expensive for home consumer use.

The present invention, however, uses a mobile or smart phone, laptop, tablet, or computer screen of a desk top computer to miniaturize and reduce the cost, bulk, and weight of a standalone holographic, three dimensional display device. By using the light, color, shading, etc. provided by a mobile phone, tablet, or laptop or desktop computer screen, the CPU of the same, and available software (augmented, if needed, by internet software) and the power supplied to and then from the mobile phone, tablet, or computer screen, a compact, seemingly untethered and visual holographic image projected from the device with great versatility is possible. This can be accomplished by sliding or placing the mobile phone, tablet, or computer screen into the device and having suitable electrical and mechanical connections between the two such that the power of the phone, tablet, or computer screen, the CPU of the phone, tablet, or computer screen, software either residing in or received by the phone, tablet, or computer screen, and the light capability of the phone, tablet, or computer screen activate and drive the device to project a three-dimensional and seemingly untethered visual set of images, a hologram, movable in space, and changing over time.

The present invention relates to making a new compact device for projecting three-dimensional and seemingly untethered images, holograms, and visual displays on the consumer level, by use of a new device having electronics, power, and optics but also using the power, CPU, software, and light of a mobile or smart phone, tablet, or laptop or desktop computer screen. Of course, any one or more of those aspects, e.g., the power, the light, and/or the CPU, could be provided by the new table top device, but it is a preferred embodiment of the present invention that the mobile or smart phone, tablet, or computer and its screen be capable of easily sliding into a receiving pocket of the table top device, for connection to the components of the device and the mobile phone, tablet, or computer and screen providing the light, power, CPU, and software for producing a three-dimensional holographic image from a two dimensional image. So, for example, the smart phone could take a photo or a set of video images of a person, while talking, as is now done with Facetime, and that set of images transformed by the software of the phone or of the table top device into three dimensional, seemingly suspended or untethered holographic image projected by a combination of the smart phone and the table top device.

It is an important aspect of the present invention that the three-dimensional or holographic image produced according to the present invention project the same into the air, above or in front of the device, suspended or untethered, holding the mobile phone, tablet, or computer screen, and that the images are not merely projected onto a screen or monitor but "floating" in the air near to but separate from the device and the smart phone. This is where the untethered or suspended aspect of the holographic images becomes so visually compelling to a viewer.

Preferably, the mobile or smart phone, tablet, or computer screen of a lap top or a desktop computer, is slid into a receiving slot or pocket of the table top device. The mobile phone is primarily responsible to provide the light, power, software, and graphics. However, some or all of the same can be provided by the table top device with the more sophisticated optics. More preferably, the two dimensional graphics are provided to the mobile phone, tablet, or computer screen via a cloud file folder or applications on the mobile phone, tablet, or computer screen. Users, or consumers, can also create their own content and load the same onto their mobile phone, tablet, or computer screen, to be used on and projected from the table top device. The device, a compact or table top holographic image provider, thus projects three-dimensional holograms above or adjacent to it. It is within the contemplation and ability of the present invention to have direct phone conversations, through sophisticated software hosting the conversion, such as SKYPE or FACETIME over distances, with the users having three-dimensional projected images of their caller, seemingly in the room with them. The present invention has the capability of providing FACETIME conversations in three-dimensional holographic forms or holographic photo frames.

The current HOLOVISION product made by Provision, the Applicant and Assignee hereof, sits on a kiosk at retail pharmacies, for example, and has three primary optical elements—a spherical mirror, a circular polarizer, and a beam splitter, geometrically positioned and arranged within an enclosure. The present invention not merely references but incorporates the teachings herein by express reference to the teachings and disclosure of U.S. Pat. Nos. 7,568,803, 7,614,749, 6,808,268, 8,279,268, and 7,517,090. These prior U.S. patents teach many aspects of the necessary and desirable components for making a standalone three-dimensional or holographic, i.e., an untethered visual imager projecting one or more visual images or stream of images into "space" i.e., in front or above the device. However, the prior art does not teach nor suggest a three-dimensional or holographic image provider that is compact, relatively inexpensive, and preferably reliant on the power, CPU, software supplied, and light of a mobile phone, tablet, Internet application and/or computer screen of a laptop and/or desktop computer.

Today, there is a variety of virtual reality (VR) goggles that a consumer can purchase and wear over the eyes, with a mobile phone being slidable therein for providing some aspects of the two-dimensional projection of images. However, in contrast, the present invention allows for the use of a highly compact device, taking up a minimum footprint on a surface like a table top, to present a stream of visual, untethered, three dimensional images, as a consequence of the use of the power, CPU, software, and lighting of the mobile or smart phone, tablet, or computer screen of the laptop or desktop computer, all to advantage of a three-dimensional holographic image projector.

SUMMARY OF THE INVENTION

The present invention relates to the use of a mobile phone, tablet, or computer screen of a laptop or desktop, as the principal driving mechanism(s) for a new compact three-dimensional or holographic projecting device. According to the present invention, the device may sit upon a table or countertop. The device may contain suitable optics, similar to but far smaller and less expensive than the devices currently in existence which sit within and upon kiosks in stores, e.g., retail pharmacies. The device is provided with a slot or pocket for facilitating the sliding in and out, placement, or removal, as desired, of a mobile or smart phone, a computer tablet, or computer screen of a laptop or desktop. When placed within the device, mechanical and/or electrical/electronic connections will be made between the table top device and its wiring and optics and the components and functions of the mobile or smart phone, tablet, or computer screen. Here, according to the present invention, the power of the mobile or smart phone, tablet, or computer screen, the CPU of the mobile phone, tablet, or computer screen, the software, either resident or taken from a cloud file or resident on the devices operating system or resident or Internet applications, and the light or brightness provided by the mobile phone, tablet, or computer screen will all integrate with the table top device to allow for a highly compact, inexpensive, three-dimensional holographic image projector. When the viewing experience is completed, the user can simply remove his or her mobile or smart phone, tablet, or laptop or desktop computer screen from the device, i.e., draw the same out of the slot or pocket, and then use the mobile or smart phone, tablet, or computer screen of the lap top or desk top in its more normal manner, i.e., as a communication device and/or a smart phone, tablet, or computer screen for messaging, contact with the Internet, for resident applications, etc.

In general, in one aspect, the invention features a table top device with a slot or pocket for receipt of a smart phone, mechanical and/or electrical connections and electronics to connect the smart phone to the table top device, a set of optics within the table top device for projecting a three dimensional image above and/or in front of the table top device to present the holographic image, and power means to power the display device and/or allow the phone to be powered or charged during use (or after use).

Implementations of the invention may include one or more of the following features: a table top device with optics for displaying a realistic holographic, untethered image or set of images, a power mechanism for the table top device, a holding pocket or drawer for receipt of a smart phone such that features of the phone are mechanically and/or electronically connected to the optics of the table top device, wherein the CPU, power, light etc. of the phone can power the table top device and/or the table top device powers the smart phone, all to enable a three dimensional visual image to present above and/or forwardly of the physical boundary of the table top device, i.e., the images are presented in a seemingly suspended or untethered manner to realistic and entertaining effect.

DETAILED DESCRIPTION OF THE INVENTION

Figure 1:
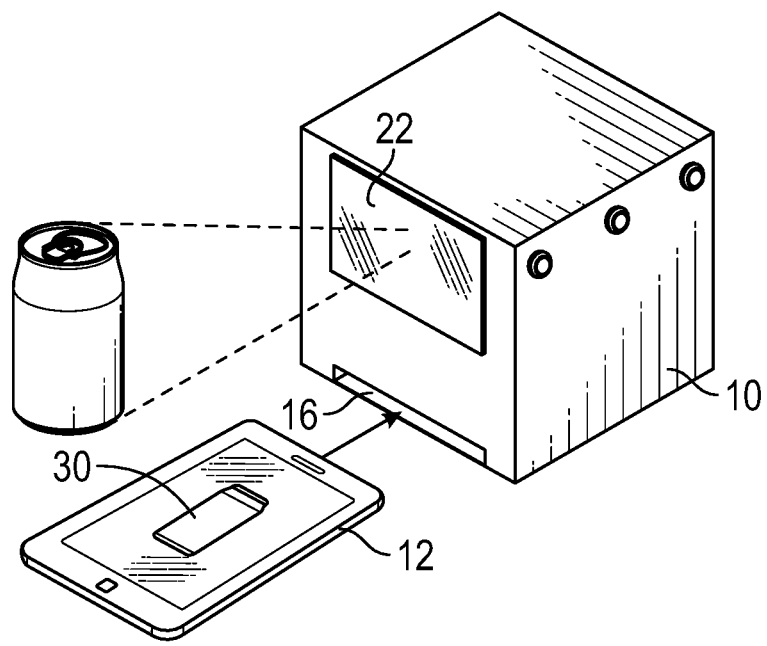
FIG. 1 is a front and top perspective view of a table top device of the present invention, showing the use of an IPAD, a tablet, or a laptop-like (or desktop with a connecting cable) device being capable of securing into and/or to the device and with its optics and electronics to thereby project a three-dimensional image or hologram into the air in front of the device, wherein the projection is untethered and seemingly suspended above the screen or physical surface of the table top device.
Figure 2:
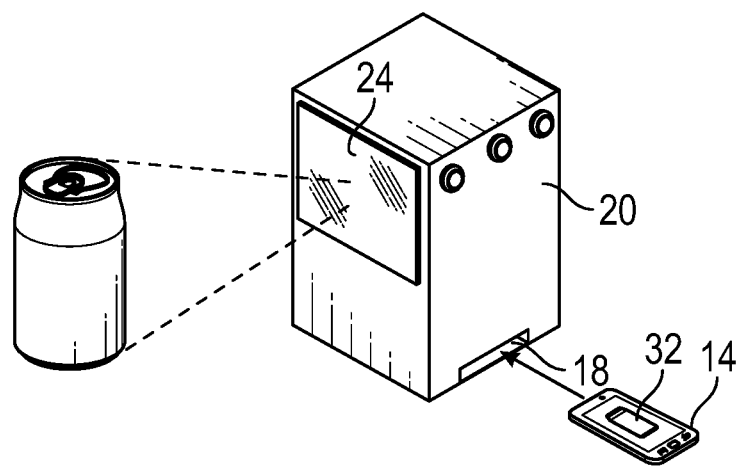
FIG. 2 is a front and top perspective view of a device of the present invention, showing the use of a commercially-available smart phone, either newly designed or as presently sold but modified for the intended purpose, which can provide a two-dimensional image onto its screen display but, when connected to the optics of the table top device, displays the image as a three-dimensional or holographic image suspended above and untethered to the device. In both FIGS. 1 and 2, a holding pocket is provided for the Laptop, Tablet or Ipad, and the smart phone, respectively to mechanically and electronically couple the two together. The source of power for the table top device can be a set of internal rechargeable batteries (not shown) or a power cord for AC can be provided. And, the table top can either be driven from the power of the batteries, the AC power or even the smart phone or the smart phone can be recharged from electronic connection to the table top device. These configurations and others will clearly appear to those of ordinary skill in the art and are within the scope of the present invention.

As seen in FIGS. 1 and 2, the present invention uses a device having a small footprint for sitting on a table or countertop. Preferably, the dimensions of the device are small, in the range of no more than about 1 square foot of footprint and a height of no more than about 1 foot, depending on the size of the product configuration and the intended other electronic device, e.g., whether the image provider is a mobile phone, tablet, or computer screen of laptop or desktop. Other dimensions can be provided without departing from the present invention. Form and function are of course to be taken into consideration.

The device 10 contains suitable optics, similar but reduced in size, quality, and cost, if necessary, from those currently available in holographic projecting devices now used in certain retail pharmacies, as made and sold by Provision. A smaller device 20 is shown in FIG. 2, meant for use with any smaller mobile or smart phone, and not a laptop, tablet or Ipad computer. These devices 10 and 20 house the three primary optical elements (not shown), namely a spherical mirror, a circular polarizer, and a beam splitter geometrically positioned within the device. These are elements for providing a holographic image projector and are not normally now presented in smart phones. For an understanding of these components, the reader is referred to the previously-identified U.S. patents and related prior art patents in the same field, with their teachings expressly incorporated herein.

As seen in FIG. 1, a side or top slot or pocket 16 can be provided for accepting and holding either a computer pad, a laptop computer, or a computer tablet 12. This is illustrated in FIG. 1. However, according to the present preferred embodiment, the present invention provides a slot, pocket, or other suitable mechanical and/or electronic connection 18, see FIG. 2, for a smart phone 14, including those made by APPLE, SAMSUNG, HTC, and BLACKBERRY. The pocket or slot 16 for holding the tablet or the pocket 18 for the mobile phone 14 must allow ease of connecting or sliding the same into the device 10 or 20, respectively, and ease of removal of the same. The pocket or slots 16 and 18, accept the laptop/tablets and the smart phones in a simple manner for insertion and removal. Just as protective cases are made today to securely protect individual phone styles, the pocket or slot 16 can be made or adapted such that it easily allows for the insertion and removal of the IPAD, tablet, computer screen, or in the case of the pocket 18 for the mobile phone 14. The pocket or slot accepts and allows ease of removal of the tablet 12 (in the case of the device 10) or the smart phone 14, from the pocket or slot 18, in the case of the device 20. The device 10 or 20 may have electrical/ mechanical controls and buttons on their top or side surfaces which mechanically or electronically engage and control the device and that of the tablet, laptop computer, or mobile phone held therein. Thus, for example, the device 20 can have a Home button which is the equivalent to and mechanically and electronically connected to the Home button of the mobile phone such that depressing the Home button on the device 20 will, in effect, depress the Home button of the mobile or smart phone. Other buttons can be provided, for example, to increase or decrease the volume of the audio, to advance, pause, rewind, etc. the projected video holographic images, etc.

The phone or the CPU-containing portable device 14 or 12, respectively, may be electrically directly connected, connected via BLUETOOTH technology, or connected via another means of connection and control to the electronics of the device 10 or 20, respectively. Additionally, the phone, pad, laptop computer, or tablet may have its operating characteristics operable by voice commands or remote controls, etc. and these, too, can be "connected" to the commands of the device.

As seen in the Figures, both the device 10 and the smaller device 20 have projecting and slightly tilted front windows or display screens 22 and 24, respectively. As can be seen in the Figures, a two-dimensional image 30 or 32 is shown on the face or monitor screen of the IPAD or tablet 12 and on the smart phone 14, respectively. In this representative example, the image or graphics are that of a PEPSI soda can. It is that two dimensional image which for the illustration is meant to be projected into space i.e., holographically untethered in front of the windows or screens 22 and 24 when the device 12 or 14, respectively, is connected and activated to cooperate with the table top devices 10 and 20. When operated as intended, the light of the smart phone, tablet or CPU-containing device, the power of the device, the software, and the images originating from the tablet or the smart phone, passing through the optics of the table top devices will cause the two dimensional images 30 or 32 of the tablet or mobile phone to project forwardly or above as three dimensional images, i.e., to be suspended, untethered, to the screen or display window 22 or 24 of the devices 10 or 20. This provides a realistic three-dimensional image or hologram to the amusement, enjoyment and entertainment of the consumer/viewer.

When the display is concluded, the user can easily slide his or her tablet or pad or smart or mobile phone 12 or 14, respectively, out of the pocket or slot 16 or 18, respectively, such that the tablet or pad or phone can be used in its more conventional manner.

According to a preferred embodiment of the present invention, the power, the light, the CPU, and the software for permitting the three-dimensional image or hologram to project through the window or display screen of the table top device 10 or 20, are preferably provided by the auxiliary device, i.e., in the example of FIG. 1, the tablet, IPAD, laptop computer, or computer screen, and in the example of FIG. 2, the IPHONE or appropriate smart phone. However, some or all of the components can be housed within the table top device. Preferably, the smart phone or tablet device provides, of course, the original two dimensional projection of the image with the three dimensional image created by software, housed either within the phone, table, or the table top device, or in the cloud, accessible to the devices via an internet connection. The sophisticated optics, however, for creating a three dimensional and holographic image from a two dimensional image are preferably only able to be housed in the table top device.

According to the present invention, the spherical mirror can be made of glass, plastic, or metal. The circular polarizer and beam splitter can be made of glass or plastic. The three optical element assembly is held within the main body of the device 10 or 20, with a retention pocket or receiving slot to secure the computing device (IPAD, laptop computer, tablet, desktop with electrical connections, IPHONE or other smart phone, etc.), selectively yet removably within and to the body of the device. The three optical element assembly is positioned within the device 10 or 20, such that the image on the primary computing device is projected through the optical assembly device, through the window or display screen, and into free space in front of the device. This produces the desired effect, in a compact manner, due to the present invention and its usage of the light, power, CPU, and software of the mobile phone, tablet, laptop computer, IPAD, and the like.

As mentioned, the retention pockets 16 and 18 are provided with openings large enough to insert a variety of computing devices, spanning from mobile phones to tablets, laptop computers, and computer screens. Alternatively, a table top unit can be adapted to only allow a specific insertion of a smart phone or mobile phone, and no other devices. An adapter for each can be provided or a single device can be designed to accept multiple, differently-sized computing devices.

The retention slot or pocket may also include an adjustment mechanism to secure the computing device (the device with the CPU) within, below, or adjacent to the device 10 or 20, and to accurately position the same, as different types, styles, and sizes of computing devices may need optical and functional distances unique to them to coordinate with the components within of the table top device.

The present invention allows for the projection of three-dimensional holographic images using a mobile computing device, preferably a mobile or smart phone as the power, light and initial display screen, i.e., the light source, the video source, the power source, and the content source, all without impacting the mobile computing device's utility when disconnected from the device so that the same can be used as a smart phone, a communicator to another and/or the internet. The present invention is intended to accept many mobile or smart phones from various manufacturers, but is preferably contemplated for use with the mobile phones manufactured by APPLE, e.g., IPHONE 7/8, and SAMSUNG, e.g., GALAXY S7/8. As newer versions of mobile phones are released, the present invention and its slot/pocket and size/optics are meant to change correspondingly.

The present invention is considered appropriate as an amusement device. It is likely to be highly desirable for phone calls. It can be used for viewing three-dimensional models of scientific works for study and research. The present invention may facilitate purchase and sales decisions, allowing one adjacent to the actual product in a first location to send a three dimensional and rotatable image of the same to a viewer potential consumer located remotely and for that consumer to rotate the product under consideration in space to see all aspects of the same. Games, three-dimensional games, and three-dimensional videos can be created for and viewed on the present invention. Mobile applications may be downloaded from the Internet, e.g., via the APPLE ITUNES or APP STORE or GOOGLE PLAY, for viewing on the three-dimensional viewer of the present invention for home use.

It is contemplated that when a mobile phone, or similar computing device, is secured into the device, the same will not accidentally fall out. A mechanical or other retention mechanism is contemplated, e.g., a door capable of closing, a latch, etc.

It is also within the contemplation of the present invention for a website to provide downloadable content to a phone for playing on the device, for the height of the projection of the three-dimensional image to be adjusted, vertically, for comfort of viewing, for a new software application to be developed which converts still and moving two-dimensional images into corresponding three-dimensional images, etc. Software may be developed that takes two-dimensional images and converts the same into three-dimensional images and for the three-dimensional images to then be moved in space, in a manner desired by the viewer. Content generation is also contemplated.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

What is claimed is:

1. A system for projecting a holographic image of an object, the system comprising:
    a mobile communicating and computing device comprising:
        a power supply source configured to generate and supply power to the mobile communicating and computing device;
        a central processing unit configured to control operations of the mobile communications and computing device;
        a display screen configured to display a two dimensional image of an object;
        software associated with generating and projecting a holographic image from the two dimensional image of the object provided to said mobile communicating and computing device; and
        a light source configured to provide light from the mobile communicating and computing device; and
    a holographic projection device comprising:
        a housing;
        a display window disposed on the housing and configured to permit the holographic image to be projected therethrough and into space adjacent to said housing;
        an optical element assembly disposed in the housing and comprising a spherical mirror, a circular polarizer, and a beam splitter;
        a slot or pocket configured to hold and maintain said mobile communicating and computing device such that the two dimensional image of the object displayed on the display screen of the mobile communicating and computing device is projected from the display screen and directly received by the optical element assembly for generating the holographic image; and
        electronic connectivity means configured to electronically connect the holographic projection device to the mobile communicating and computing device when the mobile communicating and computing device is held and maintained in the slot or pocket.

2. The system of claim 1, wherein the mobile communicating and computing device is a mobile phone or a smart phone.

3. The system of claim 1, wherein the mobile communicating and computing device is a tablet, an IPAD, or a laptop or desktop computer.

4. The system of claim 1, wherein the holographic projection device has a footprint less than or equal to 1 square foot.

5. The system of claim 1, wherein the holographic projection device has a height less than or equal to 1 foot.

6. The system of claim 1, wherein the spherical mirror is composed of glass, plastic, or metal.

7. The system of claim 1, wherein the circular polarizer and/or the beam splitter are composed of glass or plastic.

8. The system of claim 1, wherein the holographic projection device further comprises one or more adapters configured to adapt said slot or pocket to hold and maintain, at different times, two or more differently-sized mobile communicating and computing devices.

9. The system of claim 1, wherein said slot or pocket further comprises an adjustment mechanism configured to adjust positioning of the mobile communicating and computing device in relation to said housing when held or maintained in said slot or pocket.

10. The system of claim 1, wherein the holographic projection device further comprises a retention mechanism configured to retain the mobile communicating and computing device when the mobile communicating and computing device is held or maintained in said slot or pocket.

11. A method of projecting a holographic image of an object, the method comprising:
    electronically connecting a mobile communicating and computing device with a holographic projection device; and
    projecting a holographic image from the holographic projection device, the holographic image based on a two dimensional image of an object provided by the mobile communicating and computing device;
    wherein the mobile communicating and computing device comprises:
        a power supply source configured to generate and supply power to the mobile communicating and computing device;
        a central processing unit configured to control operations of the mobile communicating and computing device;
        a display screen configured to display the two dimensional image of the object;
        software associated with generating and projecting the holographic image from the two dimensional image of the object provided to said mobile communicating and computing device; and
        a light source configured to provide light from the mobile communicating and computing device; and
    wherein the holographic projection device comprises:
        a housing;
        a display window disposed on the housing and configured to permit the holographic image to be projected therethrough and into space adjacent said housing;
        an optical element assembly disposed in the housing and comprising a spherical mirror, a circular polarizer, and a beam splitter;
        a slot or pocket or other holding mechanism configured to hold or maintain a connection with the mobile communicating and computing device such that the two dimensional image of the object displayed on the display screen of the mobile communicating and computing device is projected from the display screen and directly received by the optical element assembly for generating the holographic image; and an electronic connectivity aspect configured to electronically connect the holographic projection device to the mobile communicating and computing device when the mobile computing device is held or maintained in the slot or pocket or other holding mechanism.

12. The method of claim 11, wherein the mobile communicating and computing device is a mobile phone or a smart phone.

13. The method of claim 11, wherein the mobile communicating and computing device is a tablet, an IPAD, a desktop or a laptop computer or an electrical connection to the same.

14. The method of claim 11, wherein the holographic projection device has a footprint less than or equal to 1 square foot.

15. The method of claim 11, wherein the holographic projection device has a height less than or equal to 1 foot.

16. The method of claim 11, wherein the spherical mirror is composed of glass, plastic, or metal.

17. The method of claim 11, wherein the circular polarizer and/or the beam splitter are composed of glass or plastic.

18. The method of claim 11, wherein the holographic projection device further comprises one or more adapters configured to adapt the slot or pocket or other holding mechanism to hold or maintain at different times differently-sized mobile communicating and computing devices.

19. The method of claim 11, wherein the slot or pocket or other holding mechanism further comprises an adjustment mechanism configured to adjust a positioning of the mobile communicating and computing device when held or maintained in the slot or pocket or other holding mechanism.

20. The method of claim 11, wherein the holographic projection device further comprises a retention mechanism configured to retain the mobile communicating and computing device when the mobile communicating and computing device is held or maintained in the slot or pocket or other holding mechanism.

* * * * *